(12) United States Patent
Liang

(10) Patent No.: US 6,280,680 B1
(45) Date of Patent: *Aug. 28, 2001

(54) PROCESS FOR THE MANUFACTURE OF ENVIRONMENTALLY FRIENDLY PAPERS AND COMPOSITIONS THEREFOR

(75) Inventor: Shih Huei Liang, Hsin-Shih Hsiang (TW)

(73) Assignee: Lung Meng Environmental Friendly Paper Products Hong Kong (Holdings) Limited, Hong Kong (HK)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,286

(22) Filed: May 4, 1998

(30) Foreign Application Priority Data

Mar. 5, 1998 (TW) .................................. 87103221

(51) Int. Cl.$^7$ .................................. B29C 49/04
(52) U.S. Cl. .................... 264/514; 264/129; 264/173.12; 264/173.16; 264/151; 264/291; 264/564; 264/569
(58) Field of Search ................ 264/173.12, 173.14, 264/173.15, 173.16, 173.19, 211.23, 514, 515, 291, 129, 145, 148, 151, 564, 569

(56) References Cited

U.S. PATENT DOCUMENTS 3,758,661 * 9/1973 Yamamoto et al. .................. 264/230

(List continued on next page.)

FOREIGN PATENT DOCUMENTS

| | | |
|---|---|---|
| 0 111 287 | 6/1984 | (EP) . |
| 57-22008 | 5/1982 | (JP) . |
| 61-273941 | 5/1983 | (JP) . |
| 62-53345 | 3/1987 | (JP) . |
| 7-308970 | 11/1995 | (JP) . |
| 78106420 | 3/1991 | (TW) . |
| 80105230 | 9/1992 | (TW) . |
| 82100878 | 4/1995 | (TW) . |
| 83108984 | 5/1997 | (TW) . |
| 84101407 | 7/1997 | (TW) . |

OTHER PUBLICATIONS

No. 60–215034A, 10–28–1985, Abstract of published Japanese application.

(List continued on next page.)

Primary Examiner—Jan H. Silbaugh
Assistant Examiner—Stefan Staicovici
(74) Attorney, Agent, or Firm—Christensen O'Connor Johnson Kindness, PLLC (57) ABSTRACT

A process for the manufacture of an environmental friendly paper from about 56% to about 80% by weight of inorganic mineral powders, about 43% to 18% by weight of polyethylene, and about 1% to 2% by weight of additives is provided. A composition for the manufacture of an environmental friendly paper, comprising about 56% to 80% by weight of inorganic mineral powders, about 43% to 18% by weight of polyethylene, and about 1% to 2% weight by additives is also disclosed.

15 Claims, 10 Drawing Sheets

U.S. PATENT DOCUMENTS

| | | | | |
|---|---|---|---|---|
| 3,775,521 | * | 11/1973 | Yamamoto et al. | 264/45 |
| 3,855,056 | * | 12/1974 | Maeda et al. | 162/157 R |
| 3,903,234 | * | 9/1975 | Ikeda et al. | 264/210 R |
| 4,011,128 | * | 3/1977 | Suzuki | 156/500 |
| 4,082,880 | | 4/1978 | Zboril . | |
| 4,095,012 | * | 6/1978 | Schirmer | 428/474 |
| 4,219,453 | * | 8/1980 | Sakurai et al. | 260/23 H |
| 4,318,950 | * | 3/1982 | Takashi et al. | 428/143 |
| 4,340,639 | * | 7/1982 | Toyoda et al. | 428/338 |
| 4,359,497 | * | 11/1982 | Magder et al. | 428/141 |
| 4,705,813 | * | 11/1987 | Ito et al. | 521/92 |
| 5,254,617 | * | 10/1993 | Inoue et al. | 524/433 |
| 5,552,011 | * | 9/1996 | Lin | 156/244.17 |
| 5,582,670 | * | 12/1996 | Andersen et al. | 156/242 |
| 5,759,675 | * | 6/1998 | Hamada et al. | 428/213 |

OTHER PUBLICATIONS

No. 56–118437A, 09–17–1981, Abstract of published Japanese application.
No. 05–050522A, 03–02–1993, Abstract of published Japanese application.
No. 05–032798A, 02–09–1993, Abstract of published Japanese application.
No. 59–068212A, 04–18–1984, Abstract of published Japanese application.
No. 01–156061A, 06–19–1989, Abstract of published Japanese application.
No. 61–248793A, 11–06–1986, Abstract of published Japanese application.
Handbook of Manufacture of Plastic Products, Beijing Chemical Industry Company, 1995, (first printing 1991), pp. 110–125, 142, 143.

* cited by examiner

PROCESS FOR THE MANUFACTURE OF ENVIRONMENTALLY FRIENDLY PAPERS AND COMPOSITIONS THEREFOR

FIELD OF THE INVENTION

The present invention relates to a process for the manufacture of an environmental friendly paper having up to about 80% by weight of inorganic mineral powders. More particularly, the present invention relates to a process for the manufacture of a paper having two dimensional strength by using a combination of at least of one extruder and a forming mould having an a circular die. The present invention also relates to a composition for the manufacture of an environmental friendly paper comprising up to about 80% weight of inorganic mineral powders.

BACKGROUND OF THE INVENTION

Numerous synthetic papers have been developed. Papers of single and multiple layers having polypropylene as a main component and inorganic mineral powders as fillers are produced from formulations of conventional plastic films. Papers are coextruded as a single layer or multiple layers during the process, and are formed as a sheet through a forming mould having a direct-line gate. After being stretched in a longitudinal direction, the sheet is laminated by other sheets on its two sides, and then it is stretched in latitudinal direction. The resulting multiple-layered paper has a middle layer which has been stretched in two directions and two surface layers which have only been stretched in one direction. If the sheet which has been stretched in a longitudinal direction is subjected to the stretch in a latitudinal direction, the resulting paper with a single layer or multiple layers possesses two dimensional stretched properties at its surface. Although advantages can be found in the above papers made from polypropylene, they are still inferior to the papers made from pulp. The drawbacks of the papers made from polypropylene include bad foldability, great differences between latitudinal and longitudinal tearing strength, or no tearing ability, etc. In addition, the papers made from polypropylene will not quickly decompose in a natural environment. Furthermore, the production cost of synthetic papers is much higher than that of pulp papers. In view of the above drawbacks, synthetic papers do not fully comply with the needs of consumers.

SUMMARY OF THE INVENTION

The object of the present invention is to provide a process for the manufacture of an environmental friendly paper, in which the paper comprises up to about 80% by weight of inorganic mineral powders as main components, about 43% to 18% by weight of polyethylene, and less than 2% by weight of additives.

Another object of the invention is to provide a process for the manufacture of an environmental friendly paper, in which a combination of at least one extruder and a forming mould having an a circular die is used to extrude the components as an circular film tube and the circular film tube is inflated so that the film is stretched in two dimensional direction simultaneously.

Yet another object of the invention is to provide a process for the manufacture of an environmental friendly paper, in which the density of the paper is reduced from about 2 g/cm$^3$ of the combination of the raw materials to as low as about 0.5 g/cm$^3$, saving an amount of up to 40% volume when compared with the density of pulp of about 0.7 g/cm$^3$ to about 0.9 g/Cm$^3$.

Yet another object of the present invention is to provide a process for the manufacture of an environmental friendly paper, in which the paper posseses similar properties as those of pulp paper, such as foldability, stiffness, opaqueness, writing ability, and latitudinal and longitudinal tearing strength.

Yet another object of the present invention is to provide a process for the manufacture of an environmental friendly paper, in which neither toxic gas nor smoke is produced when the paper produced is burned because only a minor amount of high density polyethylene is burned, and the paper produced is recyclable.

Yet another object of the present invention is to provide a process for the manufacture of an environmental friendly paper, in which a single-layered paper produced will decompose in a natural environment.

The above features and advantages of the present invention will be better understood with reference to the accompanying figures, detailed description and examples. It should also be understood that the particular environmental friendly paper illustrating the present invention is exemplary only and not to be regarded as a limitation of the invention.

BRIEF DESCRIPTION OF THE DRAWINGS

Reference is now made to the accompanying figures in which certain figures illustrate embodiment of the present invention from which its novel features and advantages will be apparent.

DETAILED DESCRIPTION OF THE INVENTION

By way of illustration and to provide a more complete appreciation of the present invention with many of the attendant advantages thereof, the following detailed description is given concerning the process for the manufacture of this paper.

In the process for the manufacture of a single-layered environmental friendly paper of the present invention a composition comprising about 56% to about 80% by weight of inorganic mineral powders as main components, about 43% to about 18% by weight of polyethylene and about 1% to about 2% by weight of additives is used. The inorganic mineral powders include at least two components selected from the group consisting of calcium carbonate, calcium sulfate, barium sulfate, kaolin, mica, zinc oxide, dolomite, glass fiber, hollow glass microbead, silica, chalk, talc, pigment, titanium dioxide, silica dioxide, bentonite, clay and diatomaceous earth and mixtures thereof, which have been sintered or not. Polyethylene includes high density polyethylene or a combination of high density polyethylene and at least one selected from the group consisting of medium density polyethylene (i.e., linear low density polyethylene), and low density polyethylene. The additives include those conventionally used in the art, such as coupling agents, lubricants, dispersant agents, and antistatic agents.

The coupling agent is for instance a silane coupling agent such as beta-(3,4-epoxycyclohexyl)ethyltrimethoxy-silane.

An example of lubricants is N-oleyl palmitamide. The antistatic agent is, for example, N,N-bis(2-hydroxyethyl) cocoamine or N,N-bis) 2-hydroxyethyl)stearyl amine.

Figure 1:
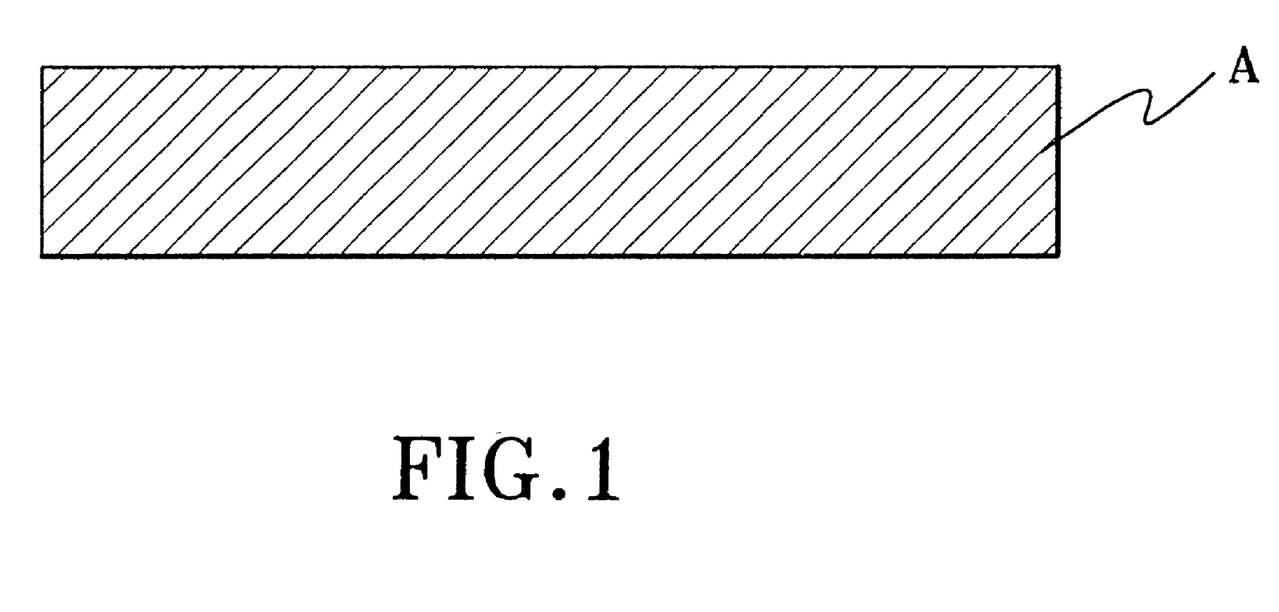
FIG. 1 represents a schematic view of a single-layered environmental friendly paper.
Figures 2, 2A, 2B:
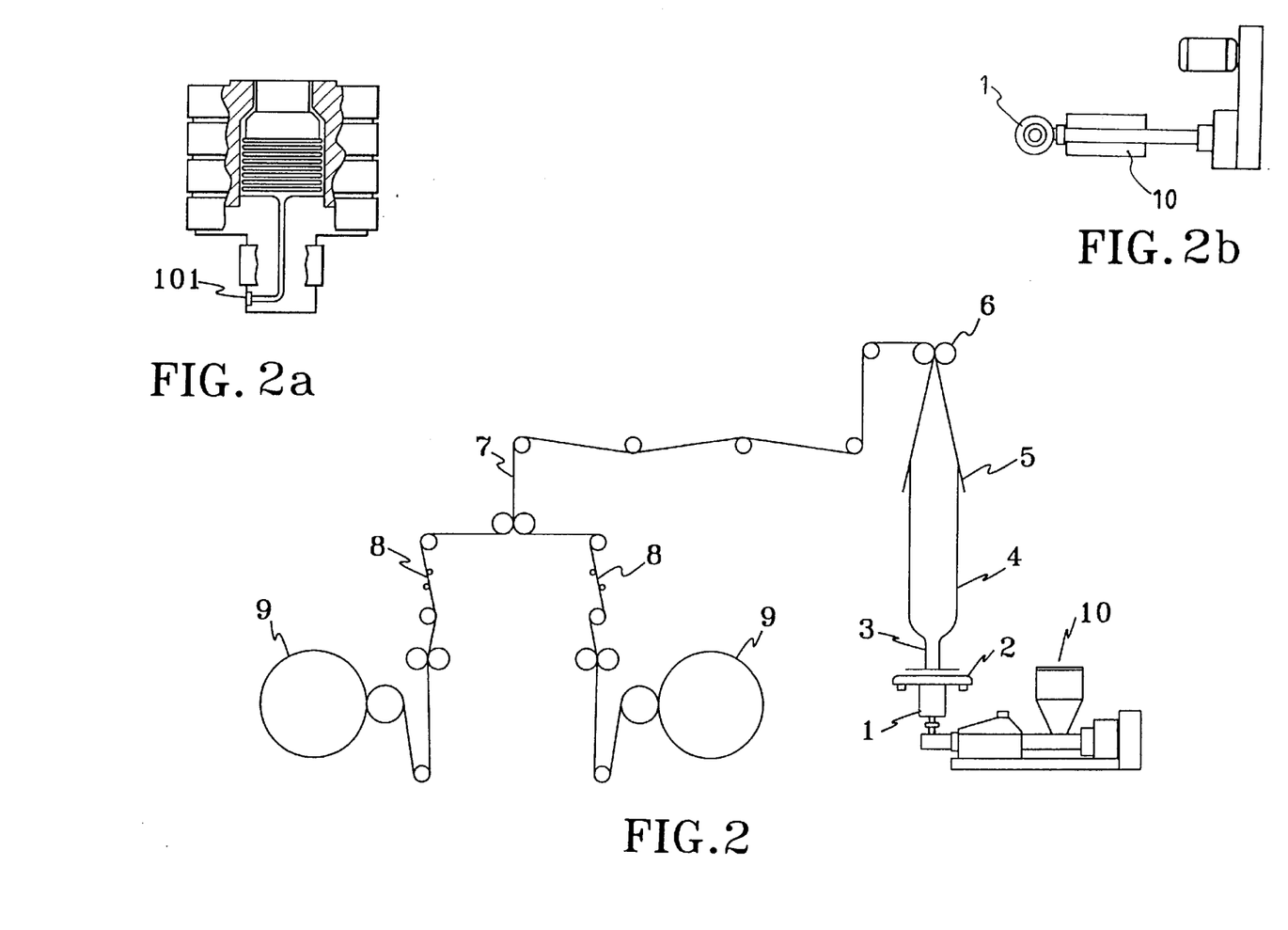
FIG. 2 represents a schematic view of a flow chart of a process for the manufacture of a single-layered environmental friendly paper.
FIG. 2a represents a schematically cross-sectional view of a forming mould having an a circular die and a single inner passage of FIG. 2.
FIG. 2b represents a schematic top view of a forming mould having an a circular die and a single extruder of FIG. 2.

After a series of treatment steps of mixing, extruding, and milling, the combination of the above-mentioned raw materials turn into granulates. Referring to FIGS. 2 and 2a, the granulates are fed into an extruder 10 (a single extruder) for producing a paper film. A forming mould 1 having an a circular die has an inlet on its surface. The inlet defines an inner passage 101 in the forming mould 1 and the inner passage 101 communicates with the gate of the forming mould 1. When the temperature of the extruder 10 is set at a temperature above the melting point of the granulates, for example, a range from about 150° C. to about 220° C., the granulates melt and are then transported to the inlet of the forming mould 1 through the single inner passage 101 by the force directly coming from two rotating screws of the extruder 10. The granulates are moulded as a paper film tube 3 having an hollow circular shape from the die of the forming mould 1. The paper film tube 3 moulded from the die of the forming mould 1 has a temperature as high as 150° C. to 220° C. and is cooled down by a cooling wind. Preferably, this is a vertically blowing wind from a cooling means 2 provided above the gate of the forming mould 1. Keeping the cooling wind blowing vertically can ensure that the shape of the paper film tube 3 is maintained as that of the gate of the forming mould 1. The temperature of the paper film tube 3 should be cooled down to about 80° C. to about 120° C. at a distance within about 700 mm from the gate of the forming mould 1, so the next step can be continued.

Next, the paper film tube 3 is inflated, for example by pressured air through a passage (not shown) in the forming mould 1. At the same time, one end of the initially moulded paper film tube 3 is drawn by a leading roller 6. The rotation speed of the leading roller 6 is controlled so that the paper film tube 3 is substantially air-tight. The rotating speed of the leading roller 6, the amount of the extruded materials from the extruder 10, and the required thickness of the paper film tube 3 are suitably controlled so that the paper film tube 3 is inflated three to eight times at a distance of about 200 mm to about 700 mm from the gate of the forming mould 1. The purpose of the inflation and drawing is to simultaneously stretch the paper film tube 3 in two directions, i.e., latitudinally and longitudinally, resulting in an environmental friendly paper 4 having a structure with two dimensional strength. Under the action of inflation, the density of the environmental friendly paper 4 can be reduced from that of the combination of the raw materials about 2 g/cm$^3$ to about 0.5 g/cm$^3$, saving an amount of up to about 40% volume when compared with the density of pulp which is about 0.7 g/cm$^3$ to about 0.9 g/cm$^3$. Because the drawing force from the leading roller 6, the environmental friendly paper 4 is drawn into a folding means 5 provided between the leading roller 6 and the cooling means 2 so that the environmental friendly paper 4 is symmetrically folded into a folded flat paper. The purposes of the leading roller 6 include drawing the initially formed paper film tube 3 with a low rotation speed so that the wind from the cooling means 2 is evenly blown thereto and stabilizing the paper film tube 3, and maintaining the paper film tube 3 air-tight so that the paper film tube 3 is evenly inflated. Also, the rotation speed of the leading roller 6 is an essential factor to the longitudinal stretch and the required thickness of the paper film. Of course, the rotation speed should be suitably adjusted to comply with the amount of extruded materials coming from the extruder 10. Then, the folded environmental friendly paper passes a cutting means 7 so that the folded paper is cut into two sheets of paper. The two resulting sheets of the environmental friendly paper are each subjected to treatment of a surface corona means 8 so that numerous microvoids are formed on the two surfaces of each environmental friendly paper and better adhesion can be obtained therefrom. The environmental friendly paper is then collected on a roll 9. During the process for the manufacture of a single-layered environmental friendly paper, the thickness of the paper can be suitably controlled within a range from about 30 μm to about 150 μm, the width can be about 0.2 m to about 3.2 m, and the density can be about 0.4 g/cm$^3$ to about 1 g/cm$^3$.

The present invention is also directed to a process for the manufacture of a double-layered environmental friendly paper. The differences between this process and that of the single-layered paper are explained in two aspects.

Figures 4, 4A, 4B:
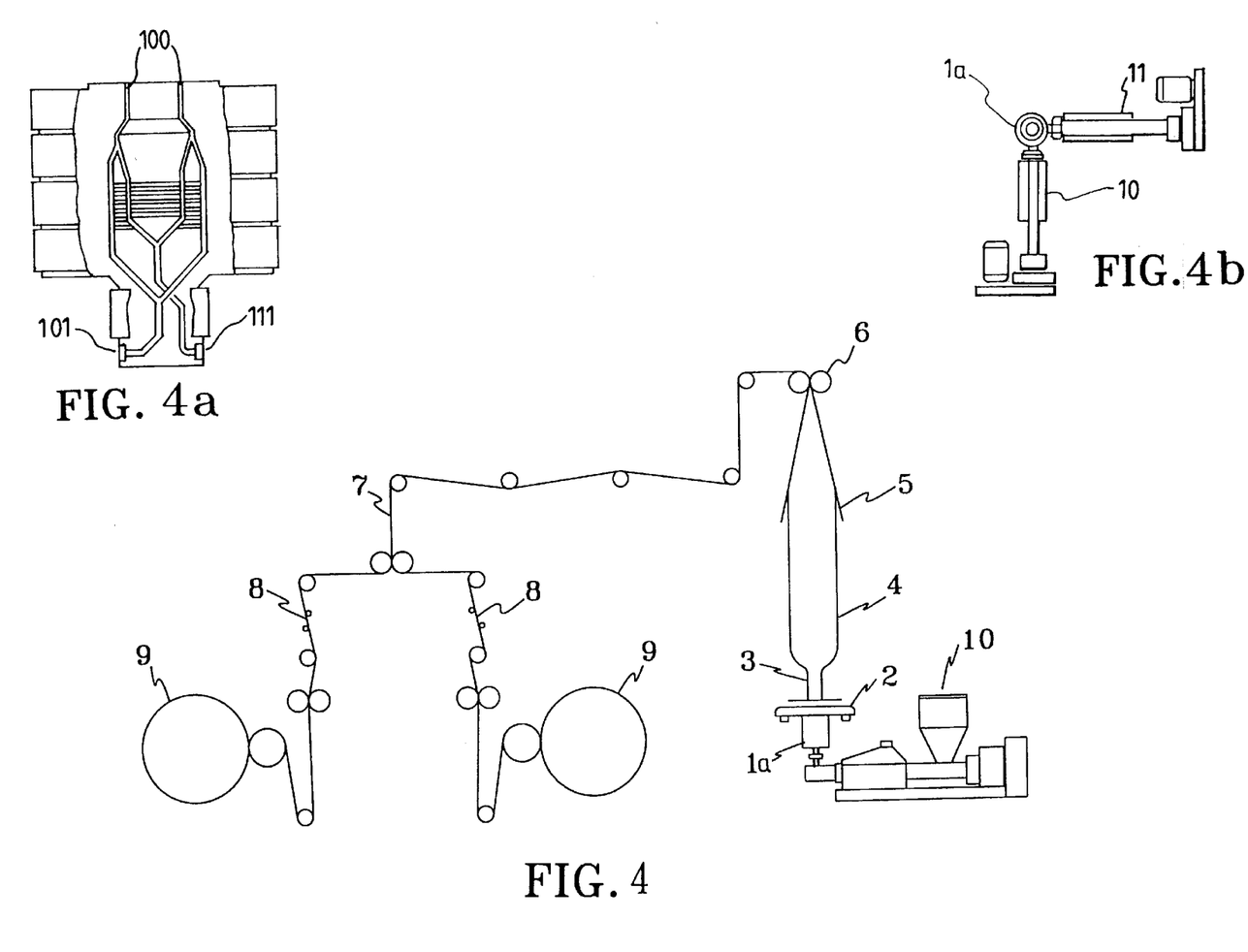
FIG. 4 represents a schematic view of a flow chart of a process for the manufacture of a double-layered environmental friendly paper.
FIG. 4a represents a schematically cross-sectional view of a forming mould having an a circular die and two inner passages shown in FIG. 4.
FIG. 4b represents a schematic top view of a forming mould having an a circular die and two extruders shown in FIG. 4.

The process of the manufacture of the double-layer environmental friendly paper is similar to that of the single-layered paper, except that the single inner passage 101 and the inlet of the forming mould 1 are replaced by two inner passages 101 and 111 and two inlets of a forming mould 1a. Referring to FIGS. 4, 4a, and 4b, the extruded materials from the extruders 10 and 11 are fed into the inner passages 101 and 111 through their corresponding inlets, respectively, and then meet at a shrunken copassage 100, resulting in a double-layered material. The double-layered material is then moulded into a paper film tube 3 having a hollow circular shape through the die of the forming mould 1a. The amount of the extruded materials and internal temperature of the extruders 10 and 11 are suitably controlled so that the materials from the inner passages 101 and 111, respectively, are combined into a double-layered material. The following steps of this process are identical with those of the process for the manufacture of a single-layered paper.

Figure 3:
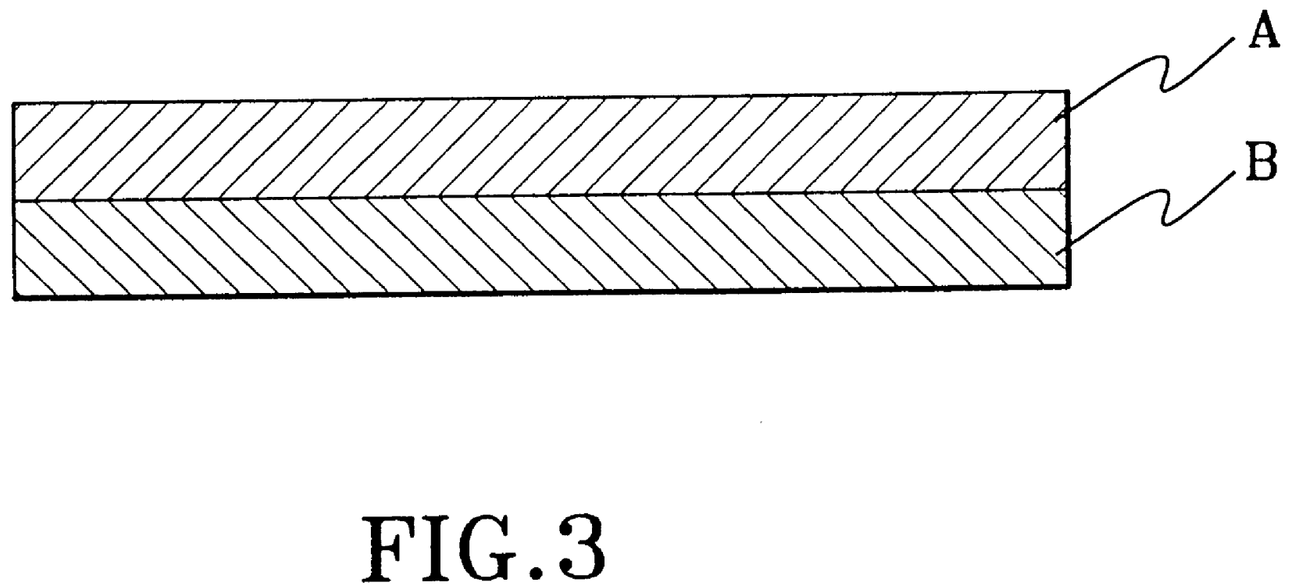
FIG. 3 represents a schematic view of a double-layered environmental friendly paper.

With respect to the raw materials for this process, the double-layered environmental friendly paper, referring to FIG. 3, comprises an A layer from the extruder 10 and a B layer from the extruder 11. The components of the A layer include about 56% to 80% by weight of inorganic mineral powders, about 43% to 18% by weight of polyethylene, and about 1% to 2% by weight of additives. A combination of the components is subjected to the steps of mixing, extruding, and milling, resulting in granulates which are to be applied to the extruder 10. The components of the B layer include about 56% to 80% by weight of inorganic mineral powders, about 43% to 18% by weight of polyethylene, and 1% to 2% by weight of additives. A combination of the components is subjected to the steps of mixing, extruding, and milling, resulting in granulates which are to be applied to the extruder 11.

According to the process for the manufacture of a double-layered environmental friendly paper, the thickness of the paper ranges from about 30 μm to about 150 μm and the density ranges from about 0.4 g/cm$^3$ to about 1 g/cm$^3$. The relative thickness of the A layer and B layer can be adjusted as required, for example, 20% A layer and 80% B layer, 50% A layer and 50% B layer, 80% A layer and 20% B layer.

Double-layered environmental friendly papers can be used for printing, packaging, and decoration, etc. Each layer of these products can be designed with different colors as required (for instance, one layer is light red and the other layer is light yellow) by adding different pigments thereto. Double-layered environmental friendly papers have the same advantages as those of the single-layered papers.

The present invention is also directed to a process for the manufacture of a triple-layered environmental friendly paper. The differences between this process and the process for the manufacture of a single-layered environmental friendly paper are explained inthe following two aspects.

Figures 6, 6A, 6B:
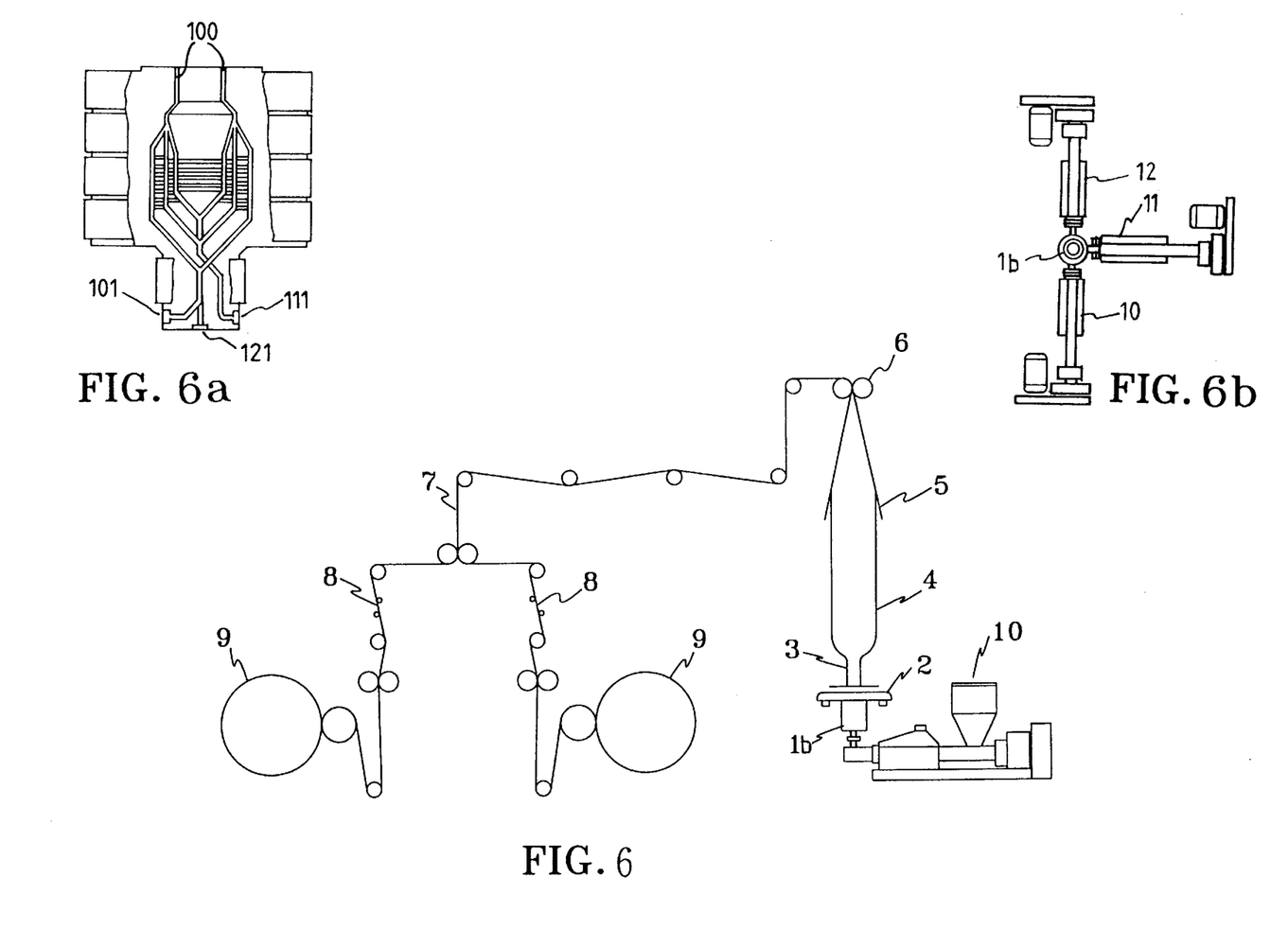
FIG. 6 represents a schematic view of a flow chart of a process for the manufacture of a triple-layered environmental friendly paper.
FIG. 6a represents a schematically cross-sectional view of a forming mould having an a circular die and three inner passages of FIG. 6.
FIG. 6b represents a schematic top view of a forming mould having an a circular die and three extruders of FIG. 6.

The process of the manufacture of a triple-layered environmental friendly paper is similar to that of the single-layered environmental friendly paper, except that the single inner passage 101 and the inlet of the forming mould 1 are replaced by three inner passages 101, 111 and 121 and three inlets of a forming mould 1b. Referring to FIGS. 6, 6a, and 6b, the extruded materials from the extruders 10, 11, and 12 are fed into the inner passages 101, 111, and 121 through their corresponding inlets, respectively, and then meet at a shrunken copassage 100, resulting in triple-layered material. The triple-layered material is then moulded into a paper film tube 3 having a hollow circular shape. The amount of the extruded material and internal temperature of the extruders 10, 11, and 12 are suitably controlled so that the materials from the passages 101, 111 and 121, respectively, are combined into a triple-layered material. The following steps of this process are identical with those of the process for the manufacture of a single-layer paper.

Figure 5:
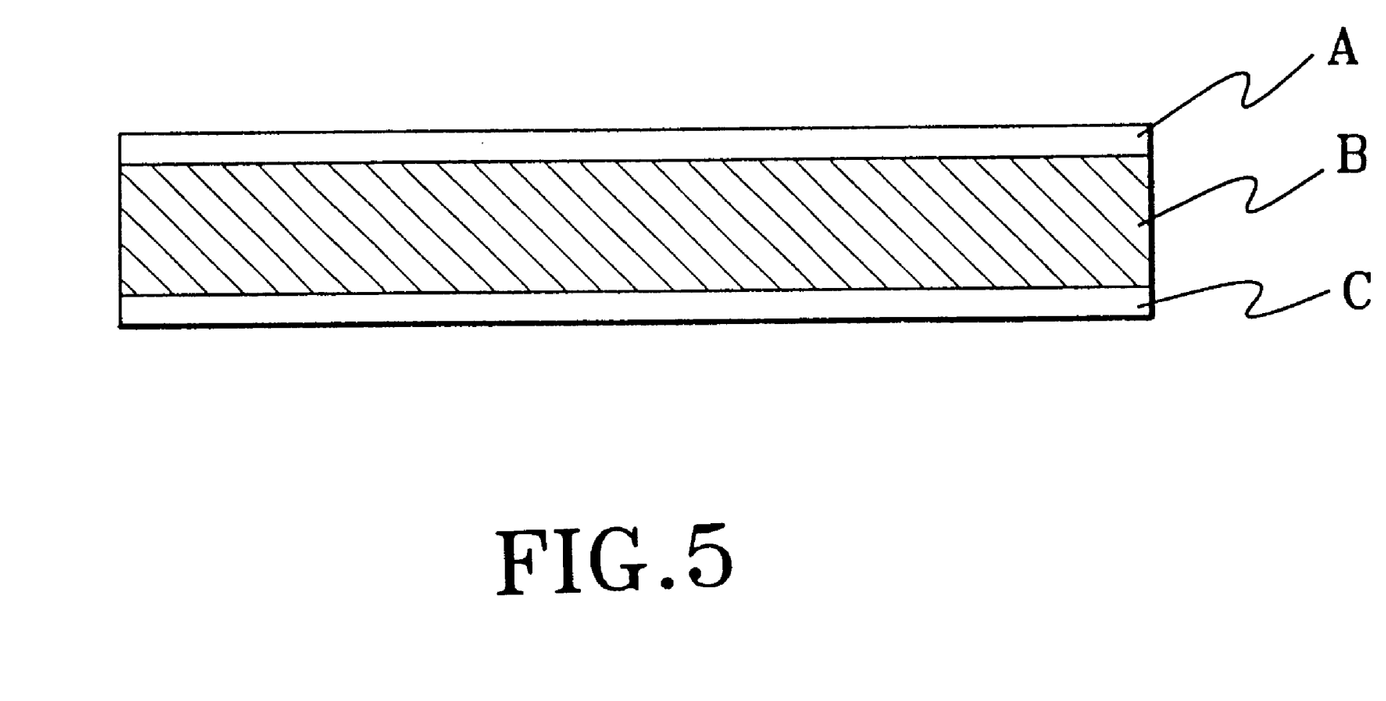
FIG. 5 represents a schematic view of a triple-layered environmental friendly paper.

Regarding the raw materials for this process, the triple-layered environmental friendly paper, referring to FIG. 5, comprises an A layer from the extruder 10, a B layer from the extruder 11, and a C layer from the extruder 12. The components of the A layer include about 56% to 80% by weight of inorganic mineral powders, about 43% to 18% by weight of polyethylene, and about 1% to 2% by weight of additives. A combination of the components is subjected to the steps of mixing, extruding, and milling, resulting in granulates which are to be applied to the extruder 10. The components of the B layer include about 56% to 80% by weight of inorganic mineral powders, about 43% to 18% by weight of polyethylene, and about 1% to 2% by weight of additives. A combination of the components is subjected to the steps of mixing, extruding, and milling, resulting in granulates which are to be applied to the extruder 11. The components of the C layer include about 56% to 80% by weight of inorganic mineral powders, about 43% to 18% by weight of polyethylene, and about 1% to 2% by weight of additives. A combination of the components is subjected to the steps of mixing, extruding, and milling, resulting in granulates which are to be applied to the extruder 12.

According to the process for the manufacture of a triple-layered environmental friendly paper, the thickness of the paper ranges from about 30 μm to about 150 μm. The relative thickness of the A layer, B layer, and C layer can be adjusted as required, for example, 10% to 25% of the A layer, 80% to 50% of the B layer, and 10% to 25% of the C layer. The triple-layered paper can be used for printing, packaging, decoration, and bags, etc. Each surface layer, i.e., A layer and C layer, of this product can be designed with different colors as required by adding different pigments thereto. Each combination of the components of the A layer, B layer, and C layer can be adjusted so as to for example increase the tensile strength of the paper for different purposes and at the same time using a higher amount of inorganic powders in the B layer, dramatically reducing costs.

It should be understood that the process of the present invention can be used to produce environmental friendly papers having more than three layers on the basis of the above-mentioned general procedures.

Figure 7A:
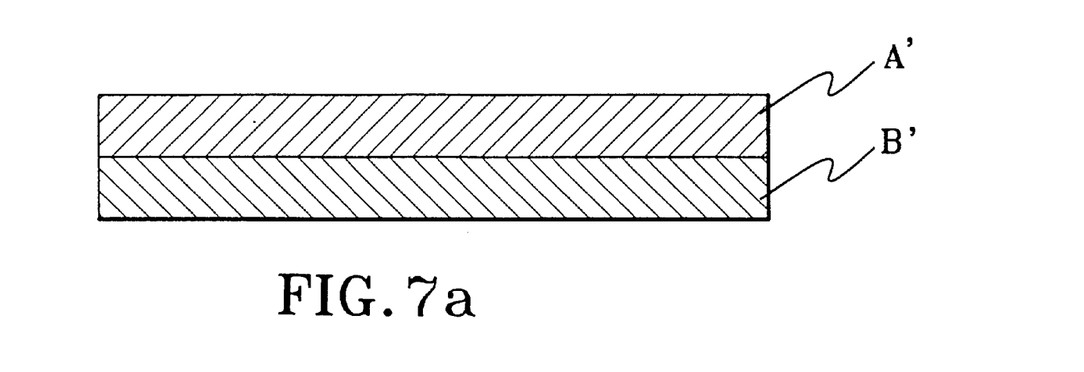
FIG. 7a represents a schematic view of a two-in-one laminated environmental friendly paper.
Figure 7B:
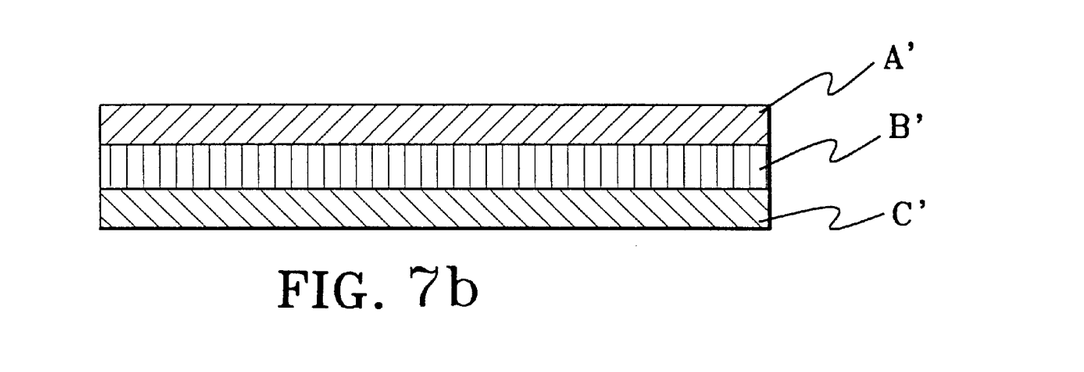
FIG. 7b represents a schematic view of a three-in-one laminated environmental friendly paper.
Figure 8:
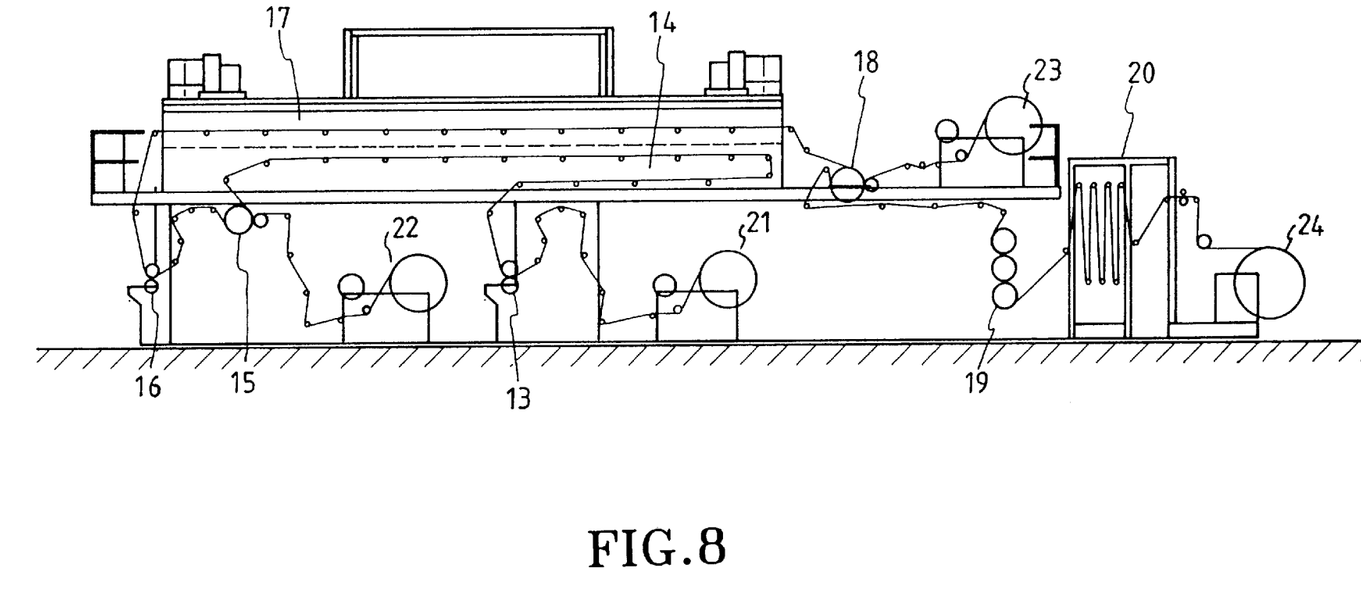
FIG. 8 represents a schematic view of a laminating machine.

Single-layered environmental friendly papers, double-layered environmental friendly papers, triple-layered environmental friendly papers, and even environmental friendly papers having more than three layers of the present invention each independently having a thickness in a range of about 30 μm to about 150 μm and independently having the same or different components can be laminated by a laminating machine as shown in FIG. 8 to form a two-layered laminated environmental friendly paper (as shown in FIG. 7a) or to form a three-layered laminated environmental friendly paper (as shown in FIG. 7b) having a thickness in a range of about 150 μm to about 450 μm.

The single-layered environmental friendly papers, double-layered environmental friendly papers, triple-layered environmental friendly papers, and even environmental friendly papers having more than three layers manufactured according to the process of the present invention can be further laminated to form laminated environmental friendly papers for specific purposes. Referring to FIG. 8, a first environmental friendly paper on a feed roller 21 is directed by means of a guiding means to a gluing means 13 to be applied with a glue on one surface of the first environmental friendly paper and then is directed to an oven 14. After the glue on the first environmental friendly paper is dried, the first environmental friendly paper is laminated with a second environmental friendly paper fed from a feed roller 22 at a lamination roller 15, forming a two-in-one laminated environmental friendly paper. The two-in-one environmental friendly laminated paper is then directed by a plurality of guiding means to a setting means 19 so that the paper is set by cooling. Then, the two-in-one environmental friendly laminated paper is adjusted by a tension controller 20 and subsequently scrolled on a roller 24. Alternatively, the two-in-one environmental friendly laminated paper before being directed to the setting means 19 can be directed to a gluing means 16 by means of a plurality of guiding means and be applied with glue. The two-in-one environmental friendly laminated paper applied with glue is then directed to an oven 17 for drying of the glue thereon. Thereafter, the two-in-one environmental friendly laminated paper is directed to a lamination roller 18 and is laminates with a third environmental friendly paper fed from a feed roller 23, resulting in a three-in-one environmnental friendly laminated paper. The resulting environmental friendly laminated paper is then directed by a plurality of guiding means to a setting means 19 so that the environmental friendly paper is set by cooling. Then, the three-in-one environmental friendly laminated paper is adjusted by a tension controller 20 and is wound onto a roller 24.

The environmental friendly papers manufactured according to the present invention can be applied to the field of printing, packaging, and decoration. Some of them can be used directly without any pretreatment while some of them need suitable pretreatment, for instance glossy surface treatment and hazy surface treatment, for special purposes. Both water borne coatings and non-water borne coatings can be used to coat the papers manufactured using the present invention. The formulation of water borne coating is comprised of acrylic resin, isopropanol, polyvinyl alcohol, clays, an anti-static agent, 28% aqueous ammonia, pure water, and vinyl acetate.

Figure 10:
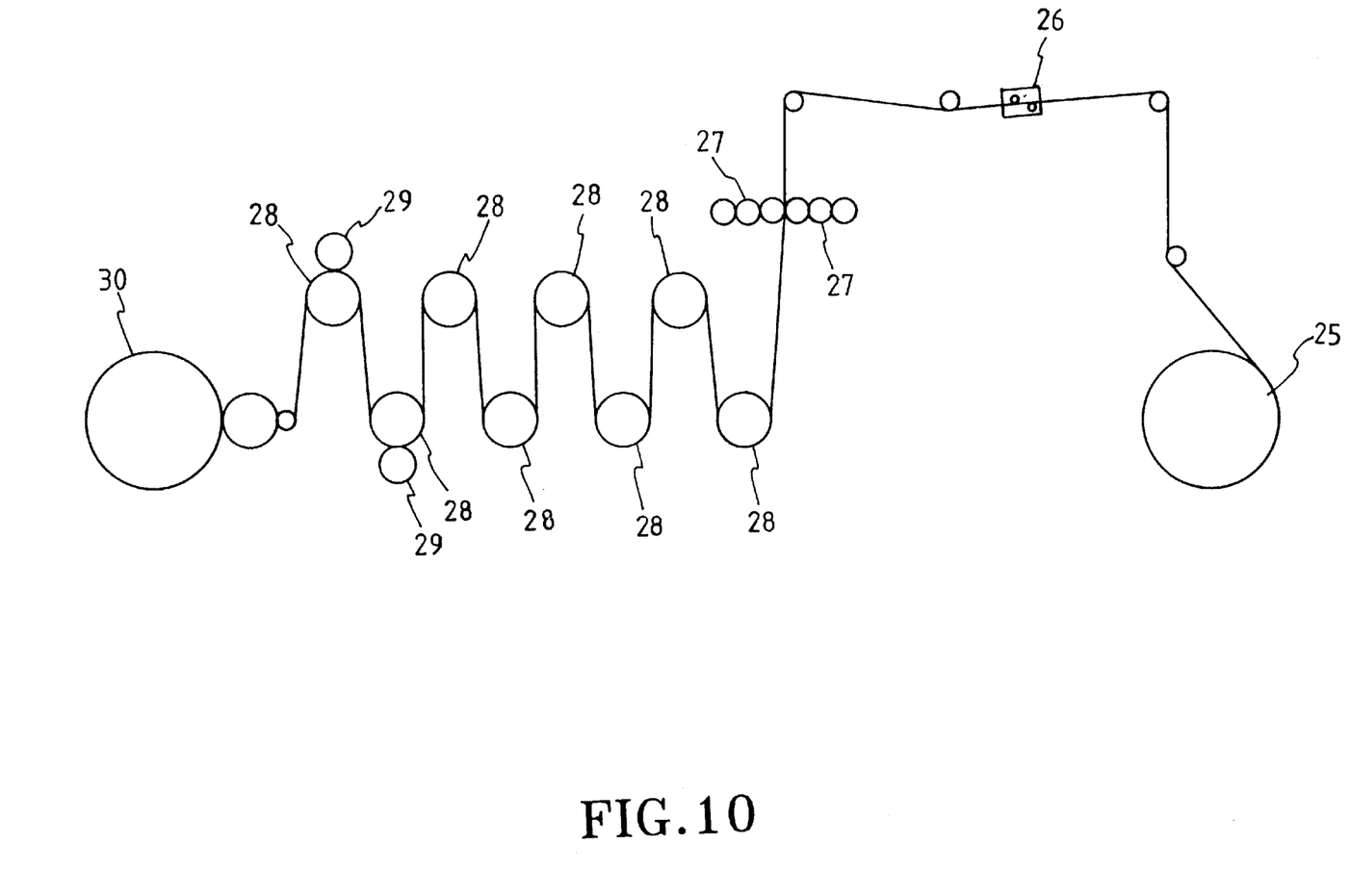
FIG. 10 represents a schematic view of a two-sided coating machine.

Referring to FIG. 10, an environmental friendly paper from a feed roller 25 is directed to a corona means 26 and treated by a high-pressure discharge to form numerous microvoids on the two sides of the paper so that the adhesion of the paper during coating is enhanced. The paper is directed to pass through two sets of coaters 27 (three coaters per set) so that the coating thickness can be suitably controlled. The coated paper is directed to a plurality of drying rollers 28 which have been subjected to mirror finish treatment so that the coated surface of the paper is quickly dried and a mirror effect is obtained. Alternatively, the paper can be pressed by a haze roller 29 so that a haze effect is imparted to the coated surface of the paper. The resulting environmental friendly paper is wound into a roller 30.

Figure 9A:
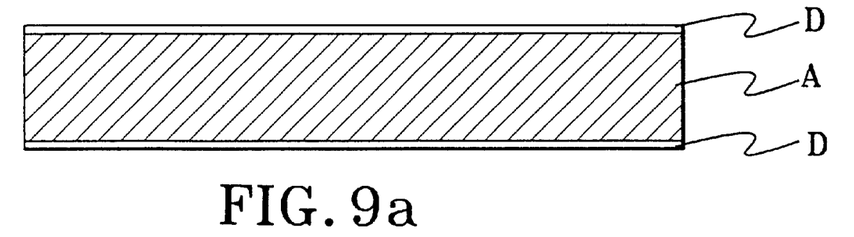
FIG. 9a represents a schematic view of the structure of a coated single-layered environmental friendly paper.
Figure 9B:
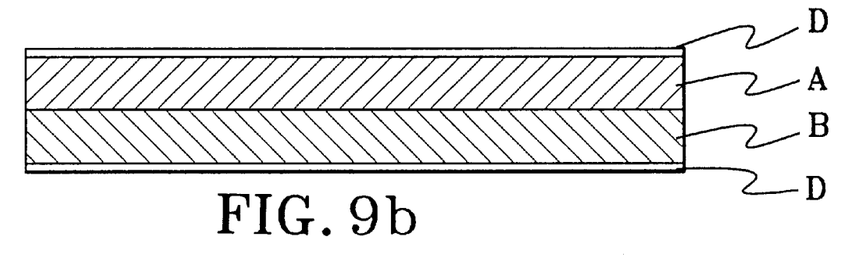
FIG. 9b represents a schematic view of the structure of a coated double-layered environmental friendly paper.
Figure 9C:
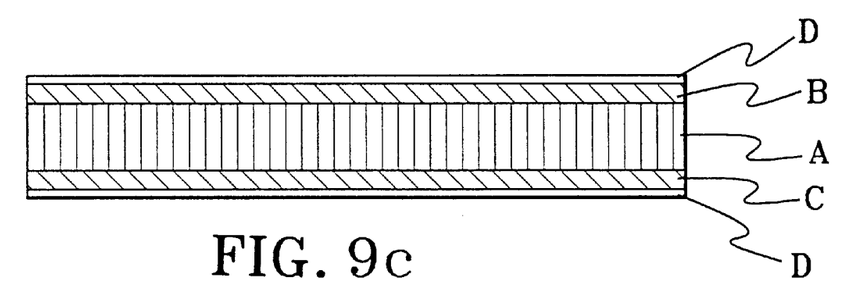
FIG. 9c represents a schematic view of the structure of a coated triple-layered environmental friendly paper.
Figure 9D:
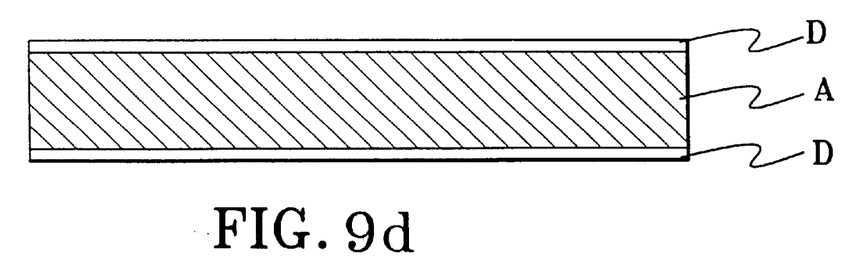
FIG. 9d represents a schematic view of the structure of a coated laminated environmental friendly paper.

The environmental friendly paper as shown in FIG. 9a is a single-layered paper which has been coated. The paper as shown in FIG. 9b is a double-layered paper which has been coated. The paper as shown in FIG. 9c is a triple-layered paper which has been coated. The paper as shown in FIG. 9d is a laminated paper which has been coated.

Environmental friendly papers of the present invention will now be further illustrated with reference to the following examples.

EXAMPLE 1

Single-Layered Environmental Friendly Paper

A single-layered environmental friendly paper is producted from a combination of 60% by weight of inorganic mineral powders (28% by weight of calcium carbonate, 7% by weight of titanium dioxide, and 25% by weight of diatomaceous earth), 38% by weight of polyethylene (20% by weight of high density polyethylene, 10% by weight of low density polyethylene, and 8% by weight of medium density polyethylene), and 2% by weight of additives (0.8% by weight of beta-(3,4-epoxycyclohexyl)ethyltrimethoxy-silane, 0.4% by weight of N-oleyl palmitamide, and 0.8% by weight of N,N-bis(2-hydroxyethyl)stearyl amine). The combination is subjected to the steps of mixing, extruding, and milling, and it results in granulates. The granulates are fed into the extruder as shown in FIG. 2 and single-layered environmental friendly papers each having a thickness of 31 μm and 52 μm are produced depending on the parameters selected.

EXAMPLE 2

Single-layered Environmental Friendly Paper

A single-layered environmental friendly paper is produced from a combination of 70% by weight of inorganic mineral powders (35% by weight of calcium carbonate, 6% by weight of titanium dioxide, 24% by weight of diatomaceous earth, and 5% by weight of clay), 28% by weight of polyethylene (20% by weight of high density polyethylene, and 8% by weight of medium density polyethylene), and 2% by weight of additives (0.8% by weight of beta-(3,4-epoxycyclohexyl)ethyltrimethoxy-silane, 0.4% by weight of N-oleyl palmitamide, and 0.8% by weight of N,N-bis (2-hydroxyethyl)stearyl amine). The combination is subjected to the steps of mixing, extruding, and milling, and results in granulates. The granulates are fed into the extruder as shown in FIG. 2, and single-layered environmental friendly papers each having a thickness of 73 μm and 82 μm are produced depending on the parameters selected.

EXAMPLE 3

Single-layered Environmental Friendly Paper

A single-layered environmental friendly paper is produced from a combination of 80% by weight of inorganic mineral powders (35% by weight of calcium carbonate, 5% by weight of titanium dioxide, 35% by weight of diatomaceous earth, and 5% by weight of talc), 18% by weight of polyethylene (high density polyethylene), and 2% by weight of additives (0.8% by weight of beta-(3,4-epoxycyclohexyl) ethyltrimethoxy-silane, 0.4% by weight of N-oleyl palmitamide, and 0.8% by weight of N,N-bis (2-hydroxyethyl)stearyl amine). The above combination is subjected to the steps of mixing, extruding, and milling and results in granulates. The granulates are fed into the extruder as shown in FIG. 2 and single-layered environmental friendly papers each having a thickness of 102 μm and 116 μm are produced depending on the parameters selected.

EXAMPLE 4

Double-layered Environmental Friendly Paper

A double-layered environmental friendly paper is composed of an A layer and a B layer. The A layer is produced from a combination of 60% by weight of natural inorganic mineral powders (30% by weight of calcium carbonate, 5% by weight of titanium dioxide, 25% by weight of diatomaceous earth), 38% by weight of polyethylene (high density polyethylene), and 2% by weight of additives (0.8% by weight of beta-(3,4-epoxycyclohexyl)ethyltrimethoxy-silane, 0.4% by weight of N-oleyl palmitamide, and 0.8% by weight of N,N-bis(2-hydroxyethyl)stearyl amine). The combination is subjected to the steps of mixing, extruding, and milling, and it results in the first granulates. The B layer is produced from a combination of 70% by weight of inorganic mineral powders (32% by weight of calcium carbonate, 3% by weight of titanium dioxide, 32% by weight of diatomaceous earth, and 3% by weight of red pigment), 28% by weight of polyethylene (18% by weight of high density polyethylene and 10% by weight of medium density polyethylene), and 2% by weight of additives (0.8% by weight of beta-(3,4-epoxycyclohexyl)ethyltrimethoxy-silane, 0.4% by weight of N-oleyl palmitamide, and 0.8% by weight of N,N-bis(2-hydroxyethyl)stearyl amine). The combination is subjected to the steps of mixing, extruding, and milling, and it results in the second granulates. The first granulates and second granulates are fed into extruders 10 and 11, respectively, as shown in FIG. 4. The following steps are the same as those in Examples 1 to 3. A double-layered environmental friendly paper having a thickness of 100 μm is produced depending on the parameters selected. The A layer constitutes 40% of the total thickness of the environmental friendly paper product and the B layer constitutes 60% of the total thickness of the environmental friendly paper product.

EXAMPLE 5

Triple-layered Environmental Friendly Paper

A triple-layered environmental friendly paper is composed of an A layer, a B layer, and a C layer. The A layer is produced from a combination of 60% by weight of inorganic mineral powders (30% by weight of calcium carbonate, 3% by weight of titanium dioxide, 24% by weight of diatomaceous earth, and 3% by weight of red pigment), 38% by weight of polyethylene (high density polyethylene), and 2% by weight of additives (0.8% by weight of beta-(3,4-epoxycyclohexyl)ethyltrimethoxy-silane, 0.4% by weight of N-oleyl palmitamide, and 0.8% by weight of N,N-bis(2-hydroxyethyl)stearyl amine). The above combination is subjected to the steps of mixing, extruding, and milling and results in the first granulates. The B layer is produced from a combination of 80% by weight of inorganic mineral powder (45% by weight of calcium carbonate, 5% by weight of titanium dioxide, and 30% by weight of diatomaceous earth), 18% by weight of polyethylene (medium density polyethylene), and 2% by weight of additive (0.8% by weight of beta-(3,4-epoxycyclohexyl)ethyltrimethoxy-silane, 0.4% by weight of N-oleyl palmitamide, and 0.8% by weight of N,N-bis(2-hydroxyethyl)stearyl amine). The combination is subjected to the steps of mixing, extruding, and milling, and results in the second granulates. The C layer is produced from a combination of 60% by weight of inorganic mineral powders (30% by weight of calcium carbonate, 3% by weight of titanium dioxide, 24% by weight of diatomaceous earth, and 3% by weight of yellow pigment), 38% by weight of polyethylene (high density polyethylene), and 2% by weight of additives (0.8% by weight of beta-(3,4-epoxycyclohexyl)ethyltrimethoxy-silane, 0.4% by weight of N-oleyl palmitamide, and 0.8 weight % N,N-bis(2-hydroxyethyl)stearyl amine). The combination is subjected to the steps of mixing, extruding, and milling, and results in the third granulates. The first, second, and third granulates are fed into extruders 10, 11, and 12, respectively, as shown in FIG. 6. The following steps are the same as those of Examples 1 to 3. The triple-layered environmental friendly paper having a thickness of 100 μm is produced depending on the parameters selected. The B layer constitutes 70% of the total thickness of the environmental friendly paper product and the A and C layers constitutes 30% of the total thickness of the environmental friendly paper product.

The following table provides testing results of the environmental friendly papers of Examples 1 to 3.

| Example No. | | 1 | | 2 | | 3 |
| --- | --- | --- | --- | --- | --- | --- |
| Average thickness (μm) | | 31 | 52 | 73 | 82 | 102 | 116 |
| Grammage (g/m²) | | 26.8 | 44.9 | 55.7 | 64.1 | 66.4 | 74.6 |
| Apparent sheet density (g/cm³) | | 0.86 | 0.86 | 0.76 | 0.78 | 0.65 | 0.64 |
| Brightness (%) | | 82.6 | 79.2 | 80.9 | 80.5 | 81.6 | 81.5 |
| Opacity (%) | | 76.3 | 90.8 | 94.2 | 95.7 | 97.7 | 98.0 |
| Tearing strength (gf) | CD | 14.2 | 36.9 | 22.0 | 29.5 | 22.8 | 26.3 |
| | MD | 22.0 | 20.0 | 18.3 | 24.8 | 22.8 | 23.0 |
| Tensile strength (kgf/15 mm) | CD | 0.91 | 0.73 | 0.97 | 1.08 | 1.14 | 1.03 |
| | MD | 0.63 | 1.09 | 1.09 | 1.22 | 1.26 | 1.13 |

Test standards for the above data are list below.

Thickness: TAPP T-411

Grammage: TAPPI T-410

Apparent density: ISO 534

Brightness: TAPPI T-452

Opacity : TAPPI T-425

Tearing strength: (TAPPI T-414)

Tensile strength: TAPPI T404

The present invention may, of course, be carried out in other specific ways than those herein set forth without departing from the spirit and essential characteristics of the present invention. The present embodiments are, therefore, to be considered in all respects as an illustration and not restrictive. Therefore, any changes coming within the meaning and equivalency range of the appended claims are to be embraced therein.

What is claimed is:

1. A process for the manufacture of an environmentally friendly paper, comprising:

forming granulates from a combination of inorganic mineral powders present in the combination in an amount from about 70 to about 80 percent by weight based on the total weight of the combination, polyethylene present in the combination in an amount from about 18 to about 29 percent by weight based on the total weight of the combination, and about 1% to 2% by weight of additives by the steps of mixing, extruding, and milling;

applying said granulates into a paper film producing means which comprises at least one extruder and a forming mould having a circular die, said forming mould having at least one inlet thereon, each said inlet defining an inner passage in said forming mould and communicating with said gate of said forming mould;

melting said granulates in said extruder, transferring the melt to said inlet of said forming mould, and moulding the melt into a hollow film tube substantially corresponding to said circular die;

cooling said film tube; and inflating said film tube and pulling an end of said film tube so that said film tube is stretched in two dimensions simultaneously to form said environmentally friendly paper;

wherein said paper has a thickness in the range of from about 73 μm to about 116 μm.

2. A process according to claim 1, further comprising a step of directing said paper into a folding means to form a folded paper.

3. A process according to claim 2, further comprising a step of directing said folded paper to a cutting means so that said folded paper is cut into two sheets of paper.

4. A process according to claim 1, wherein said extruder is at a temperature in the range from about 150° C. to about 220° C.

5. A process according to claim 1, wherein said film tube is moulded upward by said forming mould.

6. A process according to claim 1, wherein said film tube is cooled to about 80° C. to about 120° C. at a distance from about 30 mm to about 700 mm from said die of said forming mould.

7. A process according to claim 1, wherein said paper film producing means comprises one extruder and a forming mould having an inlet and an inner passage.

8. A process according to claim 1, wherein said paper film producing means comprises two extruders and a forming mould having two inlets and two inner passages.

9. A process according to claim 1, wherein said paper film producing means comprises three extruders and a forming mould having three inlets and three inner passages.

10. A process according to claim 3, wherein said paper has a thickness from about 30 $\mu$m to about 150 $\mu$m.

11. A process according to claim 3, wherein said paper can be laminated to form a laminated paper having a thickness from about 150 $\mu$m to about 450 $\mu$m.

12. A process according to claim 3, wherein said paper is further subjected to coating.

13. A process according to claim 1, wherein said inorganic mineral powders are selected from the group consisting of calcium carbonate, calcium sulfate, barium sulfate, kaolin, mica, zinc oxide, dolomite, glass fiber, hollow glass microbead, silica, chalk, talc, pigment, titanium dioxide, silica dioxide, bentonite, clay, diatomaceous earth and mixtures thereof.

14. A process according to claim 1, wherein said polyethylene comprises high density polyethylene, or a combination of high density polyethylene with at least one selected from the group consisting of medium density polyethylene and low density polyethylene.

15. A process according to claim 1, wherein said additives comprise coupling agents, lubricants, anti-static agents, and mixtures thereof.

* * * * *

UNITED STATES PATENT AND TRADEMARK OFFICE
CERTIFICATE OF CORRECTION

PATENT NO.    : 6,280,680 B1
DATED         : August 28, 2001
INVENTOR(S)   : S.H. Liang

It is certified that error appears in the above-identified patent and that said Letters Patent is hereby corrected as shown below:

<u>Title page,</u>
Item [57], ABSTRACT,
Line 9, "disclosed." should read -- provided. --

<u>Column 11,</u>
Line 10, "to about 120º C." should read -- from about 120º C. --

Signed and Sealed this

Fifteenth Day of April, 2003

JAMES E. ROGAN
*Director of the United States Patent and Trademark Office*